United States Patent
Claus et al.

(10) Patent No.: US 10,088,048 B2
(45) Date of Patent: Oct. 2, 2018

(54) METALLIC FLAT GASKET

(71) Applicant: REINZ-DICHTUNGS-GMBH, Neu-Ulm (DE)

(72) Inventors: Oliver Claus, Laichingen (DE); Georg Egloff, Weissenhorn (DE); Steffen Erthle, Dornstadt (DE); Sylvain Thuault, Lyons (FR)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 92 days.

(21) Appl. No.: 15/326,763

(22) PCT Filed: Jul. 20, 2015

(86) PCT No.: PCT/EP2015/066579
§ 371 (c)(1),
(2) Date: Jan. 17, 2017

(87) PCT Pub. No.: WO2016/009090
PCT Pub. Date: Jan. 21, 2016

(65) Prior Publication Data
US 2017/0204973 A1    Jul. 20, 2017

(30) Foreign Application Priority Data
Jul. 18, 2014   (DE) .................. 20 2014 005 866 U

(51) Int. Cl.
*F16J 15/06*    (2006.01)
*F16J 15/08*    (2006.01)
(Continued)

(52) U.S. Cl.
CPC ........ *F16J 15/064* (2013.01); *B01D 46/0002* (2013.01); *B01D 46/16* (2013.01);
(Continued)

(58) Field of Classification Search
CPC ................ B01D 35/28; B01D 46/0002; B01D 46/0012; B01D 46/16; B01D 2275/20;
(Continued)

(56) References Cited

U.S. PATENT DOCUMENTS 5,758,882 A * 6/1998 Torzewski ............. F16J 15/064
277/608
2005/0132998 A1* 6/2005 Gorgas ................... F16J 15/064
123/196 A
(Continued)

FOREIGN PATENT DOCUMENTS

DE        20019040 U1      1/2001
DE    102007019946 A1     10/2008
(Continued)

OTHER PUBLICATIONS

International Search Report and Written Opinion for Application No. PCT/EP2015/066579, dated Oct. 9, 2015, issued by the European Patent Office.

*Primary Examiner* — Jason M Greene
(74) *Attorney, Agent, or Firm* — Marshall & Melhorn, LLC

(57) ABSTRACT

A metallic flat gasket with at least one metallic layer and at least one filter element. The at least one metallic layer has at least one passage opening, which is covered by the filter element. The filter element has a mesh material.

23 Claims, 10 Drawing Sheets

(51) Int. Cl.
*B01D 46/00* (2006.01)
*B01D 46/16* (2006.01)
*F01N 3/021* (2006.01)
*F16L 23/00* (2006.01)
*F02M 26/11* (2016.01)
*F02M 26/13* (2016.01)
*F02M 26/35* (2016.01)

(52) U.S. Cl.
CPC ............ *F01N 3/021* (2013.01); *F02M 26/11* (2016.02); *F02M 26/13* (2016.02); *F02M 26/35* (2016.02); *F16J 15/0818* (2013.01); *F16J 15/0825* (2013.01); *F16L 23/003* (2013.01); *F01N 2450/22* (2013.01); *F16J 2015/0875* (2013.01)

(58) Field of Classification Search
CPC .... F16J 15/064; F16J 15/0818; F16J 15/0825; F16J 2015/0875; F01N 3/021; F01N 3/0215; F01N 2450/22
See application file for complete search history.

(56) References Cited

U.S. PATENT DOCUMENTS

| | | | | |
|---|---|---|---|---|
| 2008/0283132 | A1* | 11/2008 | Katzer | F16J 15/064 137/550 |
| 2013/0161250 | A1* | 6/2013 | Szele | F16J 15/064 210/232 |
| 2014/0090343 | A1* | 4/2014 | Egloff | F16J 15/0825 55/487 |
| 2014/0346106 | A1* | 11/2014 | Anzai | F16J 15/064 210/483 |
| 2015/0060352 | A1* | 3/2015 | Yoder | B01D 35/28 210/456 |
| 2017/0037970 | A1* | 2/2017 | Schollhammer | F16J 15/064 |

FOREIGN PATENT DOCUMENTS

| | | | | |
|---|---|---|---|---|
| DE | 102009010385 | A1 | 9/2010 | |
| DE | 202011004993 | U1 | 4/2012 | |
| DE | 202014102014 | U1 | 5/2014 | |
| DE | 202014102014 | U1 * | 6/2014 | ............... F16J 15/08 |
| DE | 202014005866 | U1 | 7/2015 | |

\* cited by examiner

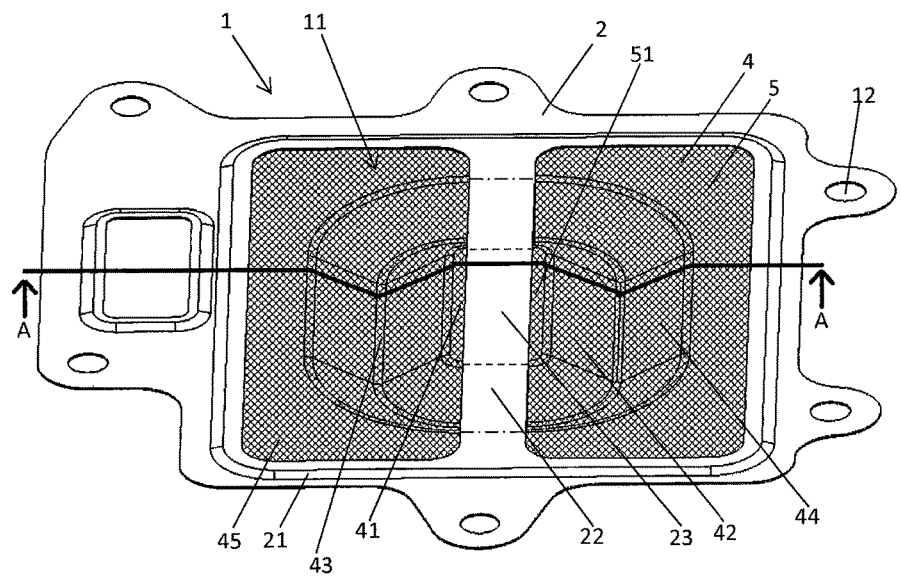
Fig. 1-a
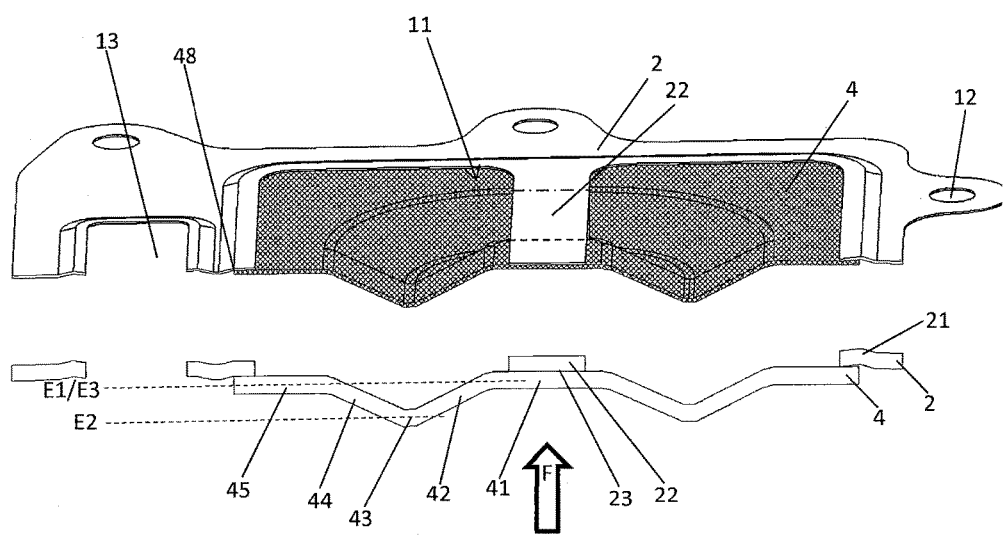
Fig. 1-b

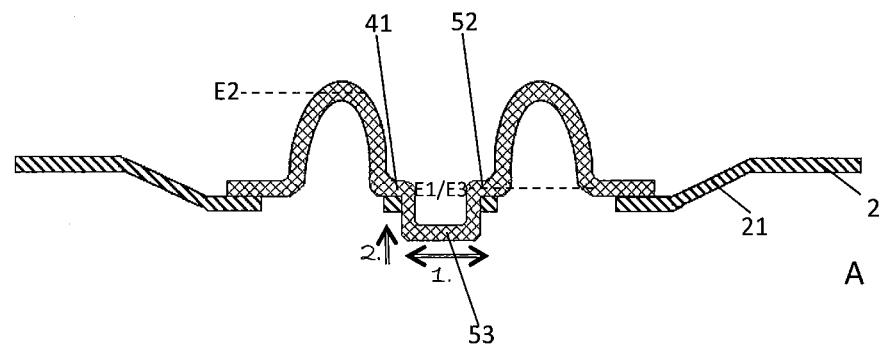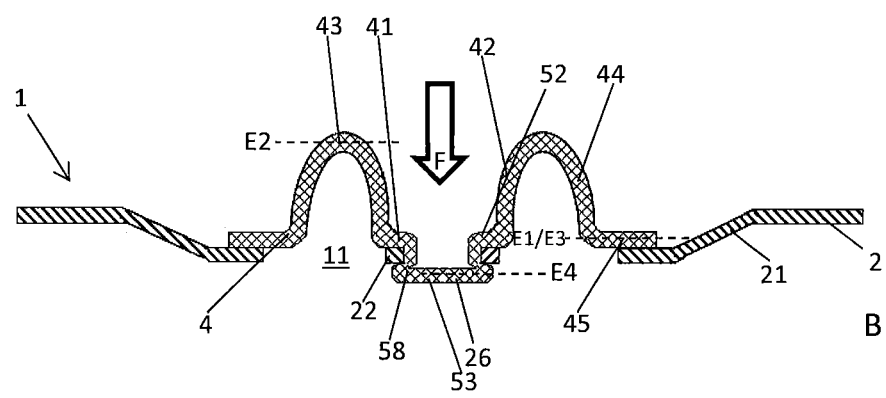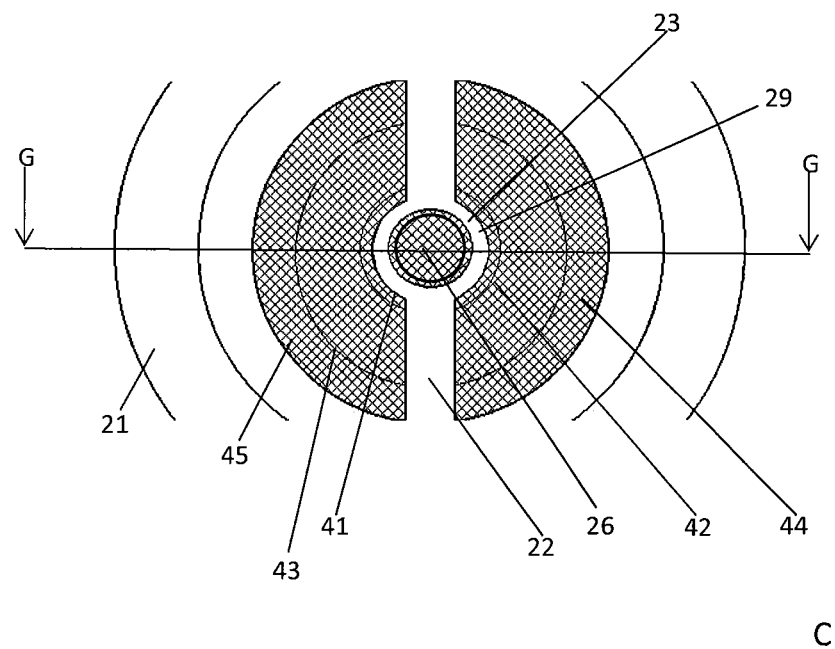
Fig. 7

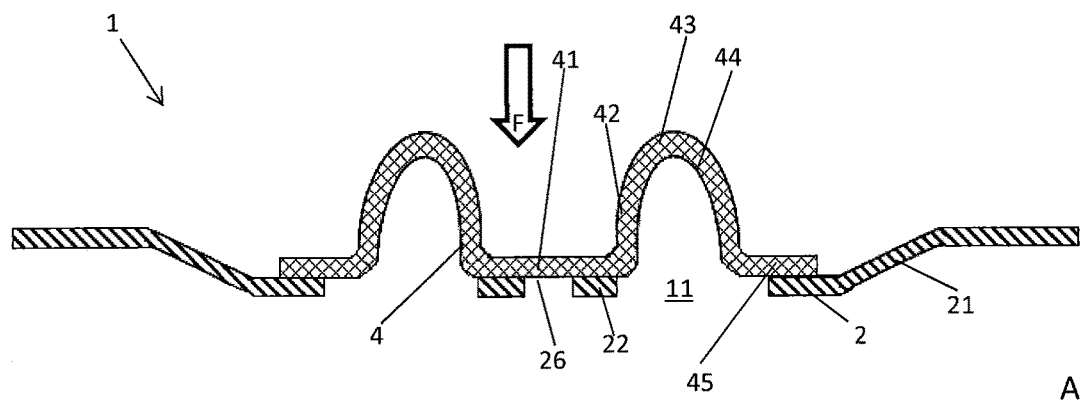
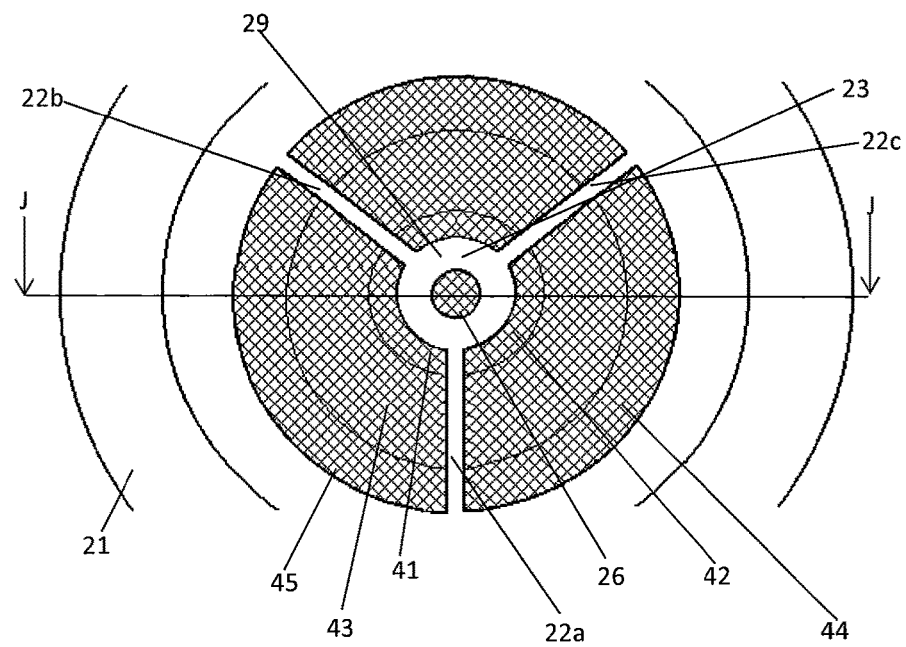
Fig. 9

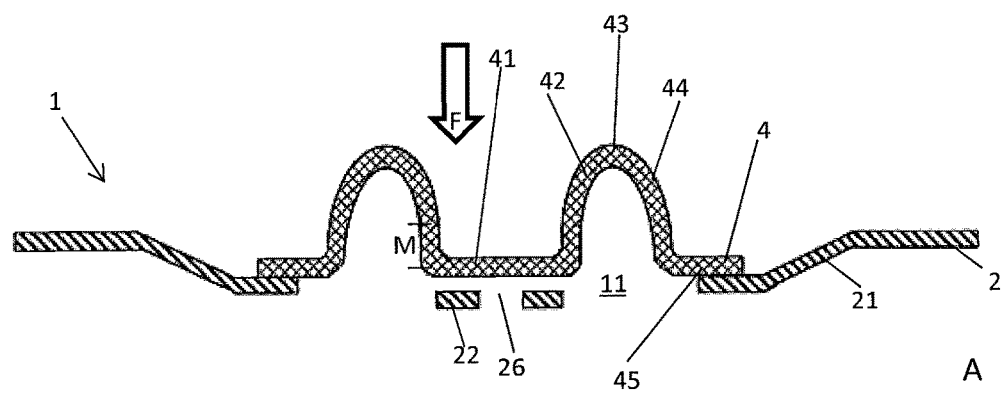
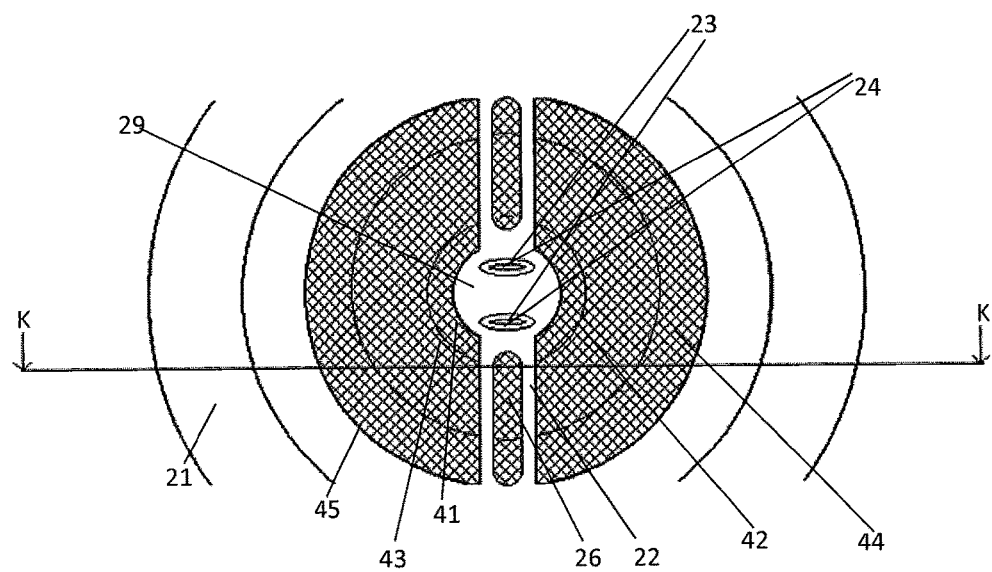
Fig. 10

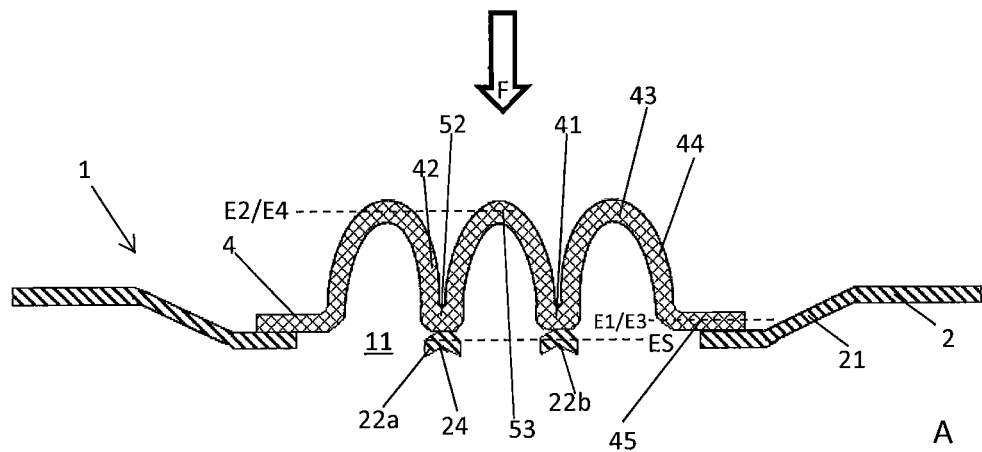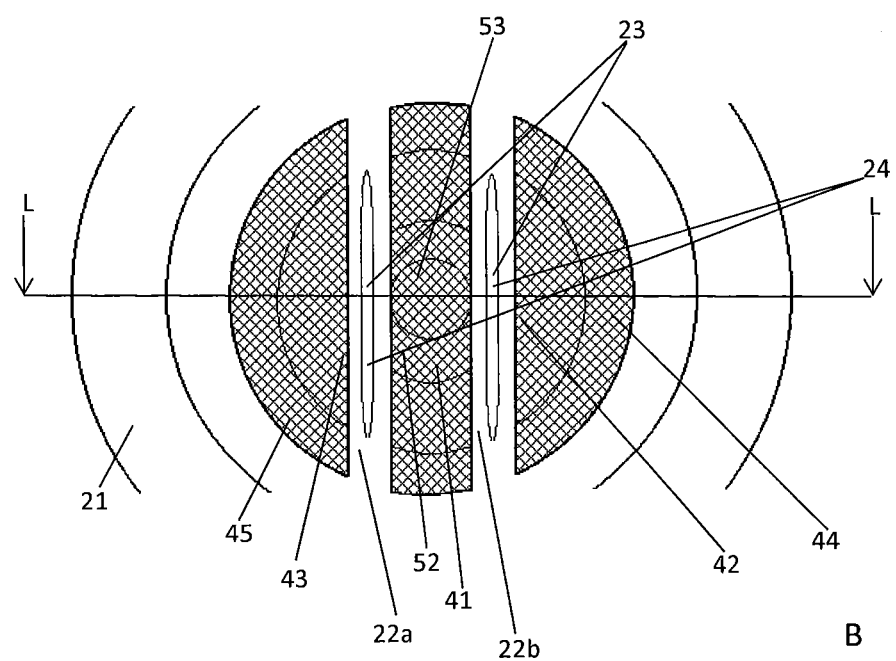
Fig. 11

METALLIC FLAT GASKET

BACKGROUND OF THE INVENTION

The invention relates to a metallic flat gasket with a passage opening, which is covered by a filter element. The gasket thus on the one hand serves for the sealing of a transition of a pipe between two parts and on the other hand for catching particles, which are comprised in the fluid streaming through this pipe.

In the state of the art, it has been tried to provide gaskets with a filter effect in that an entire gasket layer from a filter material is installed in the gasket between at least two metal sheet layers, in particular from a woven material and in that the areas surrounding the filter areas are filled with a sealing material, e.g. with an elastomer, as is described in DE 10 2007 019 946 A1. Such filters can only be used in a very limited temperature range because of the filling material, so that they are not suited for applications with hot gases. Further, the production process of the multi-layered gasket is very laborious.

In the same way, it has been tried to produce gaskets with filters in that the holes of the filter are directly introduced into the gasket layer, e.g. using etching or using laser, as this is for instance described in DE 10 2009 010 385 A1. This ascertains a good stability of the filter layer. However, doing so, often holes are produced which are too large. Further, the methods are very time-consuming so that the gaskets cannot be produced in the cycle times required and in an allowable cost frame.

Often, in addition, the installation space available for the filtration is very small as the cross-sectional area of the fluid passage to be filtered is very small. Furthermore, the filter elements formed only in the plane of the gasket cause an unacceptably high pressure drop of the passing fluid. DE 10 2009 010 385 A1 shows embodiments where the gasket layer in the area of the filter is formed out of the plane in a cylinder-shaped manner so that not only the basic area of the cylinder but also the lateral walls produced by this shaping are available as filter area, so that the pressure drop is reduced. In addition to the disadvantages of this approach for the filter integration already mentioned, the shaping of the material causes a reduction of the metal sheet thickness in the areas affected, which causes that the metal sheet, into which the holes have been formed, no longer provides the structural stiffness required.

The same is true for the filter bowls made from woven filter mentioned in DE 20 2014 102 014 U1, which are connected to a layer of the metallic flat gasket via a clamping ring or through folding over of the edge regions of gasket layer and filter element one around the other. Here, the freely protruding woven filter does not provide sufficient structural stiffness in order to prevent elongations caused by the high pressures and temperatures of the fluid passing through it. Consequences of this are an unregulatedly enlarged width of the filter element and therefore an unregulated filter effect.

Recently, this has been taken into account in gaskets with a filter insert made from a wire mesh, in that gaskets with filter bowls have been produced where in addition to an embossed, in particular beaded gasket layer and a simple deep-drawn filter bowl from a wire mesh, a frame-shaped support element is provided which is deep-drawn, too, and with which the filter bowl is kept in its position even when loaded with high fluid pressures. The laborious double deep-drawing process, namely of the sheet layer and of the filter element, here is required as both the bottom of the filter bowl and the frame of the support element are pronouncedly bent out of the plane of the flat gasket, to be more precise from the plane of the gasket layer in the surrounding of the filter element, in order to provide the filter area required on the one hand and in order to guarantee for a sufficient support of this filter bowl on the other hand. In addition to the resilient material of the beaded gasket layer, which cannot be reshaped by deep-drawing, one further needs the non-resilient material of the support element from a metal sheet which can be deep-drawn and which generally is more expensive than the resilient material required to form the elastic bead. Thus, almost twice as much material is required, as no permanently elastic sealing elements can be embossed into a metal sheet which allows deep-drawing.

SUMMARY OF THE INVENTION

It is therefore the object of the present invention to provide for a metallic flat gasket with at least one sealing layer into which a filter element is integrated, which on the one hand provides for a sufficient passage area and on the other hand a reproducible mesh width, too. The gasket shall be producible from as few parts as possible and with as simple processes as possible. Further, the laborious deep-drawing of metal sheets shall be avoided, so that a resilient metal sheet can be used for the entire sheet-based part of the gasket.

This object is solved with the metallic flat gasket according to the claims. Advantageous embodiments follow from the dependent claims.

The invention therefore relates to a metallic flat gasket with at least one metallic layer, with the at least one metallic layer comprising at least one passage opening, which is covered by a filter element, with the filter element consisting in a mesh material or comprising such and comprising at least one resting section, which extends at least in sections in a first plane, comprising at least one gutter-shaped camber section stretching along or surrounding the at least one resting section at least in sections, which camber section(s) camber to a second plane, comprising at least one edge section surrounding the resting section(s) and the camber section(s) at least in sections, which edge section extends in a third plane at least in sections, with the second plane being different from the first and third plane.

This invention is preferably realized in one of two basic variants. In both of them, passage opening is spanned by the filter element in such a way that in a projection into the plane spanned by the edge of this passage opening, the resting section, the camber section and at least part of the edge section are situated within this passage opening. Only a marginal part of the edge section is situated outside of this passage opening, it can be used for the connection between the at least one metallic layer of the flat gasket and the filter element. Both basic variants mainly differ in the amount of resting sections, and as a consequence of this the amount of camber sections. The first basic variant relates to A metallic flat gasket with at least one metallic layer, with the at least one metallic layer comprising at least one passage opening, which is covered by a filter element, with the filter element consisting in a mesh material or comprising such. The filter element further comprises a resting section, which at least in sections extends in a first plane, comprising at least one gutter-shaped camber section stretching along or surrounding the resting section circumferentially, which camber section cambers to a second plane, comprising an edge section surrounding—preferably annularly—the resting section and the camber section, which edge section extends in the third plane at least in sections, with the second plane being different from the first and third plane.

Thus, the invention in a first variant relates to a metallic flat gasket with at least one metallic layer, namely a metal sheet layer. This at least one layer comprises at least one passage opening, which is covered by a filter element. This filter element consists in a mesh material or comprises such. The filter here is not flat, but comprises several sections which at least in sections extend in different planes. The resting section of the filter element at least in sections extends in a first plane, it spans the passage opening completely. The resting section here may be at least in sections or completely, in particular annularly surrounded by or adjacent to a camber section which in its cross section shows a gutter shape and which protrudes until a second plane. Thus, this second plane is different from the first plane. The camber section spans the passage opening, too. The resting section and the camber section together are surrounded—preferably annularly—by an edge section, which edge section at least in sections extends in a third plane. This third plane is different from the second plane, too. The camber section thus comprises a first intermediate area which connects the first plane to the second plane as well as a second intermediate area which connects the second plane and the third plane with each other. These two intermediate areas thus span the filter element in such a way that it does not extend flat in a plane, but that it comprises large surface areas, in which it extends transverse to this plane, so that the entire filter area compared to a flat filter but also compared to a bowl filter is considerably increased. In the second basic variant, the invention relates to A metallic flat gasket with at least one metallic layer, with the at least one metallic layer comprising at least one passage opening, which is covered by a filter element, with the filter element consisting in a mesh material or comprising such. The filter element further comprises at least one resting section, which extends at least in sections in a first plane, comprises at least two gutter-shaped camber sections streching along or surrounding the at least one resting section at least in sections, which camber sections camber to a second plane, comprises at least one edge section surrounding—preferably (at least in sections) annularly—the at least one resting section and the at least two camber sections, which edge section extends in a third plane at least in sections, with the second plane being different from the first and third plane.

In this second variant, the invention thus also relates to a metallic flat gasket with at least one metallic layer. This at least one metallic layer again comprises a passage opening, which is covered by a filter element. This filter element consists in a mesh material or comprises such. The filter element in this second variant is not flat, neither, but comprises several portions, which at least in sections extend in different planes. At least one resting section of the filter element extends at least in sections in a first plane. The at least one resting section here may be at least in sections surrounded by or adjacent to at least two camber sections, which here again in their cross section have a gutter shape and extend until a second plane. This second plate therefore is different from the first plane. The at least one resting section and the at least two camber sections together are surrounded—preferably (at least in sections) annularly—by an edge section which at least in sections extends in a third plane. This third plane is different from the second plane, too. Again, the—now at least two—camber sections comprise a first intermediate area which connects the first plane and the second plane to each other as well as a second intermediate area, which connects the second plane and the third plane to each other. These two intermediate areas thus span the filter element in such a way that it does not extend flat in one plane, but comprises large surface areas in which it extends transversely to this plane so that the entire filter area compared to a flat filter, but also compared to a simple bowl filter is considerably enlarged.

The term flat gasket here is not to be understood in such a limiting way that it is a completely flat element. In particular due to the profiling of the filter, but also due to the embossed sealing elements, the flat gasket considerably protrudes from its plane, but given its considerably larger extension in or parallel to this plane than orthogonal to it, it is nevertheless considered a flat gasket.

The multiple cambering of the filter element in both variants of the invention provides an increased structural stiffness to the filter element even without an additional support. It further allows to deliberately adapt the mesh width of the filter element in that it is produced from a mesh material of smaller mesh width by regular deep drawing. However, deep drawing is limited to the filter element.

The metallic flat gasket of the second variant preferably comprises a filter element in such a way that it comprises at least two cambering sections, which together encircle the at least one resting sections along at least 50%, preferably along at least 55% of its perimeter, in particular immediately. Here, the camber sections preferably extend straight and preferably at least two of the at least two camber sections extend parallel to each other. The distance between the area of the camber sections, which extend in the second plane and the area of the at least one resting section, which extends in the first plane in a projection into a common plane is thus preferably not constant, but extends in such a manner that—starting at one edge of a camber section—it first increases and then decreases again towards its other end.

The edge section of the filter element in both variants preferably rests at least in sections on the at least one metallic layer, so that here an outer contact section is given. In this edge section, there exists a first opportunity for the connection of the filter element to the at least one layer of the metallic flat gasket, which results in an outer connection section. This connection is preferably realized as an adhesive connection, in particular as a welding connection. If the metallic flat gasket comprises several layers, then the adhesive connection can be realized either between more than one layer, in cases all layers, of the metallic flat gasket and the filter element or only between the filter element and one layer of the flat gasket; there generally exists the possibility to additionally connect the several metallic layers, to be more precise the metal sheet layers of the flat gasket to each other, in such a way that this connection does not include the filter element. This additional connection is preferably realized in an area which is radially distanced to the filter element.

For the sealing of the at least one passage opening, the metallic flat gasket outside of the connection section comprises a bead in at least one of the metallic layers. This bead preferably surrounds the passage opening completely. It is preferably realized as a half bead. This bead here does not only surround the passage opening but also the filter element and seals the latter in the plane of the flat gasket towards the outside.

In order to support the filter element, at least one support section is provided in the metallic flat gasket, which support section preferably protrudes into the at least one passage opening. The support section is preferably formed as a protrusion of at least one of the sheet layer(s) of the metallic flat gasket, it is thus an integral element of this at least one layer. The support section comprises at least one contact section, to which the resting section of the filter element rests to. This way, the support section supports the filter element in the area of its resting section and this way also prevents from warpages of the filter element so that non-admissible increase of the filter openings is avoided. It is defined here that the metallic sheet layer of the metallic flat gasket which forms the inner contact section with the filter element is the first metallic layer.

As the filter element cambers out of the plane of its edge section, thus from the third plane not only to one direction, but additionally comprises cambers in the opposite direction, thus backwards towards the direction of the third plane, no deep-drawing of the metal sheet layer is necessary, as the support of the filter here can be realized in such a way that the sealing layer itself realizes the support. To achieve this, it is not necessary to deflect the sealing layer pronouncedly from its plane which would require deep-drawing, but the support sections over a large share of their extension extend in the plane, in which the sealing layer immediately at the outer edge of the passage opening spanned by the filter element extends, too. The support sections in sections may comprise embossed structurings, so that it is generally valid that the extension of the support sections in the direction of the fluid flow, thus transverse to the passage opening, stretches at the most by 2.5 mm, preferably by at the most 1.5 mm about the plane in which it extends immediately at the outer edge of the passage opening, thus even in the outermost contact area with the edge section. This is quite a common degree of stretching.

In one embodiment, the support section does not only extend into the at least one passage opening, but bridges the latter. This way, an outstanding support of the filter element is achieved. To this end, it is preferred that the support section is realized bridge-shaped. As an alternative, the support section may also bridge the passage opening star-shaped, preferably with three rays. The support section may bridge the passage opening with constant shape but it may also show at least one enlargement in its course. With a star-shaped support section, an enlargement is preferably given in the area where the rays join. This enlargement section itself may comprise at least one passage opening. The at least one support section may also be realized in such a way that it comprises slits outside of the at least one inner contact section, which slits allow for an adaptation of its resilient behavior. Here, the support section preferably immediately continues in one of the metal sheet layers of the flat gasket.

The resting section of the filter element on the one hand can be designed in such a way that it forms an essentially closed plane. "Closed" here relates to the extension of the filter element. It does not mean that the openings of the filter element in the support section shall be closed, but that the support element in the resting section extends in one plane and does not comprise any sections which protrude out of this plane. When the filter is a woven filter or the like, the filter of course continues with its usual structure, but the entire structure shows no topography.

On the other hand, the support section may be designed in such a way that it forms an annular area, which encircles a bowl-like section. This bowl-like section points away from the first plane and reaches to a fourth plane. This way, a third intermediate section is formed, so that the entire filter area is further enlarged. The second and fourth plane here may be identical or different from each other.

For a better support of the filter element, the support section of at least one metallic layer of the flat gasket in the area of the inner contact section with the resting section of the filter element comprises an embossment. With this, one can on the one hand realize a spring-back of the support element. On the other hand, the actual resting surface of the resting section can be reduced so that a larger passage surface of the filter element is available.

The inner contact section of support section of the at least one metallic layer and resting section of the filter element can further be used in order to connect that least one metallic layer and the filter element with each other. This connection on the one hand can be realized adhesively, thus in particular by welding of the metal sheet layer and the filter element in the area of the inner contact section. On the other hand, the connection may also be realized as a positive fit. To this end, in the at least one metallic layer, a passage opening is provided, through which the filter element is guided, so that the filter element projects on the opposite surface of the at least one metallic layer. In a next step, the projection is back-embossed so that it projects laterally over the edge of the passage opening at least in sections. The back-embossing is for instance realized in a two-step process, in which the projection is first deformed into a lateral protrusion and only afterwards the actual back-embossment to the surface of the at least one metallic layer is realized. One-step reshaping processes are possible, too.

The first, second, third and if given the fourth plane in a particularly simple embodiment of the metallic flat gasket can be realized parallel to each other. As an alternative, it is however also possible that the planes do not extend parallel to each other. It is in particular possible that the second and/or fourth plane are inclined relative to the first and/or third plane. Such an inclination allows to deliberately guide the fluid flow. An inclined shape may also be needed if the installation space requires such. If the second and third plane extend parallel to each other, it is preferred if the second plane and the third plane show a distance, which amounts to 1 to 20 mm, preferably 3 to 10 mm.

The first and third plane are advantageously realized parallel to each other. In this respect, it is on the one hand possible that they are identical so that the resting section and the edge section extend in the same plane. On the other hand, the first and third plane may also show a distance; this distance in particular amounts to up to 2 mm, preferably up to 1 mm.

In order to support the filter element particularly effectively, the inner contact section at least in sections extends in an area, which is distanced to the centroid of the passage opening by less than 20%, preferably less than 15% of the diameter or of the longest extension of the passage opening. Relative to the surface, the inner contact section extends within those 13%, preferably 10% of the surface of the passage opening which are closest to the centroid of the passage opening.

In general, it is preferred if the filter element comprises a free filter area as large as possible so that a surface as large as possible is available for the passage of the fluid. In a projection of the area of the filter element to the plane of the support section of the at least one metallic layer, the facial extension of the inner contact section between the resting section of the filter element and the support section corresponds to at the most 10%, particularly preferably to at the most 5% of the area of the filter element projected into this plane.

When choosing the material of the filter element, the stability of the filter element and the fluid passage opening have to be adapted to each other. It is advantageous if the filter element at least in sections consists in a woven filter, however more advantageous if it consists in a woven filter over its entire area. The weave can be a plain weave, a twill weave or a three-dimensional weave. The weft here consists in particular in a steel wire, preferably a stainless steel wire. As an alternative for higher temperatures, wires from Nickel-based alloy are possible, too. A filter element, which consists in a woven filter only in sections, comprises for instance a folded-over outer frame made from a metal sheet.

In this context, it is advantageous if the filter element of the metallic flat gasket in the edge section and outside of the connection section has a wire thickness of 0.04 to 0.2 mm, preferably of 0.05 to 0.15 mm.

In order to catch particles from the fluid, the mesh width of the filter element is of particular importance. In the area of the steepest ascent of the filter element in the intermediate area between the first and second plane, the filter element preferably shows a mesh width of 0.05 to 0.5 mm, particularly preferably of 0.1 to 0.3 mm. In case of a three-dimensional weave, the porosity of the weave, thus the volume share of air in the weave is higher than 65%, preferably higher than 70%.

Preferably, the filter element at its outer edge is compressed, in particular circumferentially compressed. This way, one ascertains that individual threads of the filter will not get loose so that they would pollute passing fluid on their own.

Various metal sheets can be used for the at least one metallic layer. Preferably, one on the one hand uses steel sheets, in particular such ones with a tensile strength of at least 1100 N/mm$^2$ preferably at least 1350 N/mm$^2$. This results in a good resilience of the bead and therefore in an excellent sealing. One preferably uses stainless steels. On the other hand, nickel-based alloys can also be advantageous as they have a higher temperature durability. One preferably uses such metal sheets from nickel-based alloys with a tensile strength of at least 750 N/mm$^2$, preferably at least 900 N/mm$^2$. Even higher tensile strengths are generally preferred. The tensile yield strength of these materials, which is smaller than 22% is further sufficient for the deformation required here. In general, it is preferred if the metallic flat gasket comprises exactly one metallic sheet layer besides the filter element.

The metallic flat gasket can be realized multi-layered. A respective embodiment can combine at least one layer from steel metal sheet with a nickel-based alloy sheet. It is however preferred if the metallic flat gasket comprises one layer only. In addition to the lower cost, the reduced thermal resistance between the parts also results in advantages, in particular for the sealing between parts from an aluminum alloy.

The metallic flat gasket is in particular used as a gasket in the area of hot gases, preferably for the exhaust gas recirculation in internal combustion engines. Here, the filter element serves for catching particles, which may have detached from the catalyst, so that these parts cannot find their way into the turbocharger. Given the temperatures of the fluids passing the gasket, it is preferred that the at least one metallic layer is not coated. Nevertheless, for some applications, it is preferred that the at least one metallic layer is coated with a polymer-based coating one- or both-sided, over its entire surface or partially.

BRIEF DESCRIPTION OF THE DRAWINGS

In the following, the invention is further described using drawings. These drawings only serve for an illustration of preferred embodiments of the invention without the invention being limited to them. Identical or similar parts in the drawings are referred to with identical or similar reference numbers. In addition to the essential characteristics of the present invention laid down in the independent claims, the figures also comprise optional and advantageous enhancements in different combinations. Each individual one of these advantageous and/or optional enhancements can improve the invention described in the independent claims, also without combination with one, several or all of the optional and/or advantageous enhancements shown simultaneously in the respective example.

The figures schematically show:

FIG. 1: In a perspective top-view, in a cut perspective top-view and in a cross-section a first embodiment of a metallic flat gasket according to the invention;

FIG. 7: Two cross-sectional representations and a schematic partial top-view to a further metallic flat gasket from its bottom side;

FIGS. 8 to 11: Each a sectional view and a partial, schematic top-view to further metallic flat gaskets according to the invention from their bottom side.

DETAILED DESCRIPTION OF THE INVENTION

Figure 2:
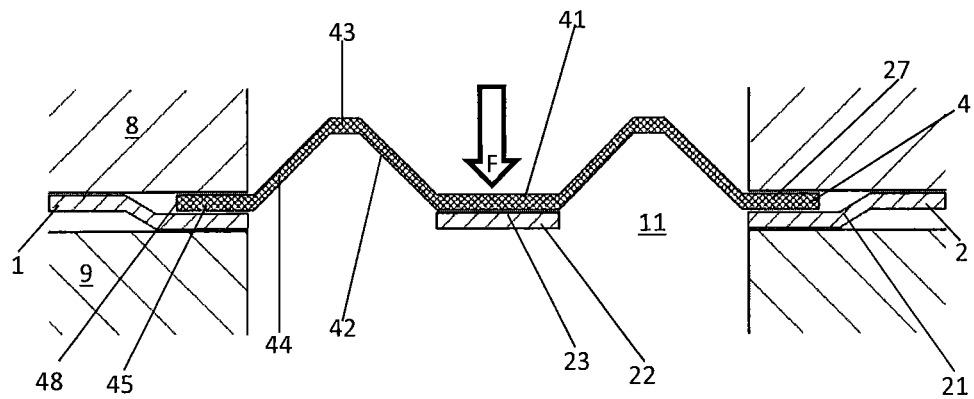
FIG. 2: A sectional view of the installation position of a metallic flat gasket according to the invention between two fluid-guiding parts.

FIG. 1 in a perspective top-view in FIG. 1-*a*, in a section of this top-view along the line A-A from FIG. 1-*a* in the upper part of FIG. 1-*b* and in an enlarged sectional view only with respect to the direction orthogonal to the plane of the gasket in the lower part of FIG. 1-*b* illustrates a first embodiment of a metallic gasket 1 according to the invention. The metallic flat gasket according to the invention comprises exactly one metallic layer 2 from a steel sheet, in which a passage opening 11 is formed through which a fluid is guided from one of the adjacent parts—which are not shown—to the other one. In order to prevent particles, as they are for instance released from a catalyst, from being guided further and to damage parts which are situated downstream, a filter element 4 made from a mesh material 5, here from a stainless steel wire with a wire diameter of 0.09 mm and a mesh width of 0.125 is integrated into the metallic flat gasket 1, which mesh element 1 spans the fluid passage opening 11. The main flow direction of the fluid is indicated with an arrow marked with an F. The filter element 4 here is not realized as a simple flat filter, as this is often the case in the state of the art, but increases the effective filter area inside of the limited space of the fluid transition in that it cambers out of the plane spanned by its edge section 45. When considering the profile of the filter element 4, one can differentiate between a resting section 41 situated in and around the middle, a first intermediate section 42, a camber section 43, a second intermediate section 44 and then the edge section 45. The resting section 41 extends as a flat, closed area 51 in a first plane E1. The resting section 41 here is circumferentially encircled by a camber section 43, the most pronouncedly cambered area of which extends in the plane E2. The planes here are in each case arranged in the neutral fiber of the filter layer 4, as becomes clear from the lower part of FIG. 1-*b*. This figure also illustrates that the planes E1 and E2 extend distanced to each other but essentially parallel to each other. The distance here is 8 mm. In its cross-section, the camber section 43 appears gutter-shaped. The resting section 41 and the camber section 43 together are encircled annularly by an edge section 45. The stainless steel layer 2 of the flat gasket 1 rests on the outer edge 48 of the filter element 4. For the sealing of the passage opening 11, this outer edge 48 of the filter element 4 is surrounded by a bead 21 in the stainless steel layer, which as a half bead encircles the passage opening 11. Only on the side of the cross-section drawn on the left side, this half bead appears to be a full bead as it extends very close to the half bead which surrounds the additional fluid passage opening 13. The first and the third plane E1 and E3 in the present example are identical, so that E3 is also different from E2. Between the camber section 43 and the edge section 45, a second intermediate area 44 is spanned, which connects the planes E2 and E3.

In the one metal sheet 2 of the metallic flat gasket 1, a support section 22 is formed, which extends into the fluid passage opening 11 and bridges the latter between the two chain dotted lines. The support section 22 here consists in a bridge-shaped appendix of the gasket layer 2, which bridges the passage opening at half its width. Only in the two areas between a dashed line and a chain dotted line, the support section 22 is floating, elsewhere, it rests to the edge section 45 or to the resting section 41 and prevents that the filter element 4 deforms unacceptably. The support section 22 here is a one-piece appendix of the metal sheet 2, thus no connection of the support to the gasket layer 2 is required.

The embodiment of FIG. 1 thus corresponds to the first variant of a metallic flat gasket 1 according to the invention. The basic shape of the passage opening 11 here is rectangular with rounded corners. The outer shape of the camber section 43 and the resting section 41 is rectangular with rounded corners. Other basic shapes are in general possible, as is indicated in the following embodiments, e.g. round or oval basic shapes.

While in FIG. 1, the passage openings 12 for fastening means are shown, too, as well as a further fluid passage opening 13, the subsequent drawings do without a representation of such secondary passage openings although some of them are present in the respective gasket 1. The subsequent illustrations focus on the illustration of the design of the passage opening 11 for fluids.

FIG. 2 illustrates a fluid passage between two parts 8, 9, at which a metallic flat gasket 1 according to the invention ascertains the sealing. The metallic flat gasket 1 as in the embodiment of FIG. 1 consists in a metal sheet 2 with a passage opening 11, which is spanned by a filter element 4. The main flow direction of the fluid here is directed from above to below, as indicated with arrow F. The camber section 43 thus cambers against the main flow direction F. The outer edge 48 of the filter element here as in the embodiment of FIG. 1 is situated radially within the area surrounded by the half bead 21 in the metallic layer 2. The filter element is designed comparable to the embodiment of FIG. 1 with respect to the resting section 41, the first intermediate area 42, the camber section 43, the second intermediate area 44 and the edge section 45. The outer contact section 27 of metallic layer 2 and filter element 4 here is completely situated outside of the fluid stream, so that this area is particularly suited for the connection of both elements of the metallic flat gasket 1.

Figure 3:
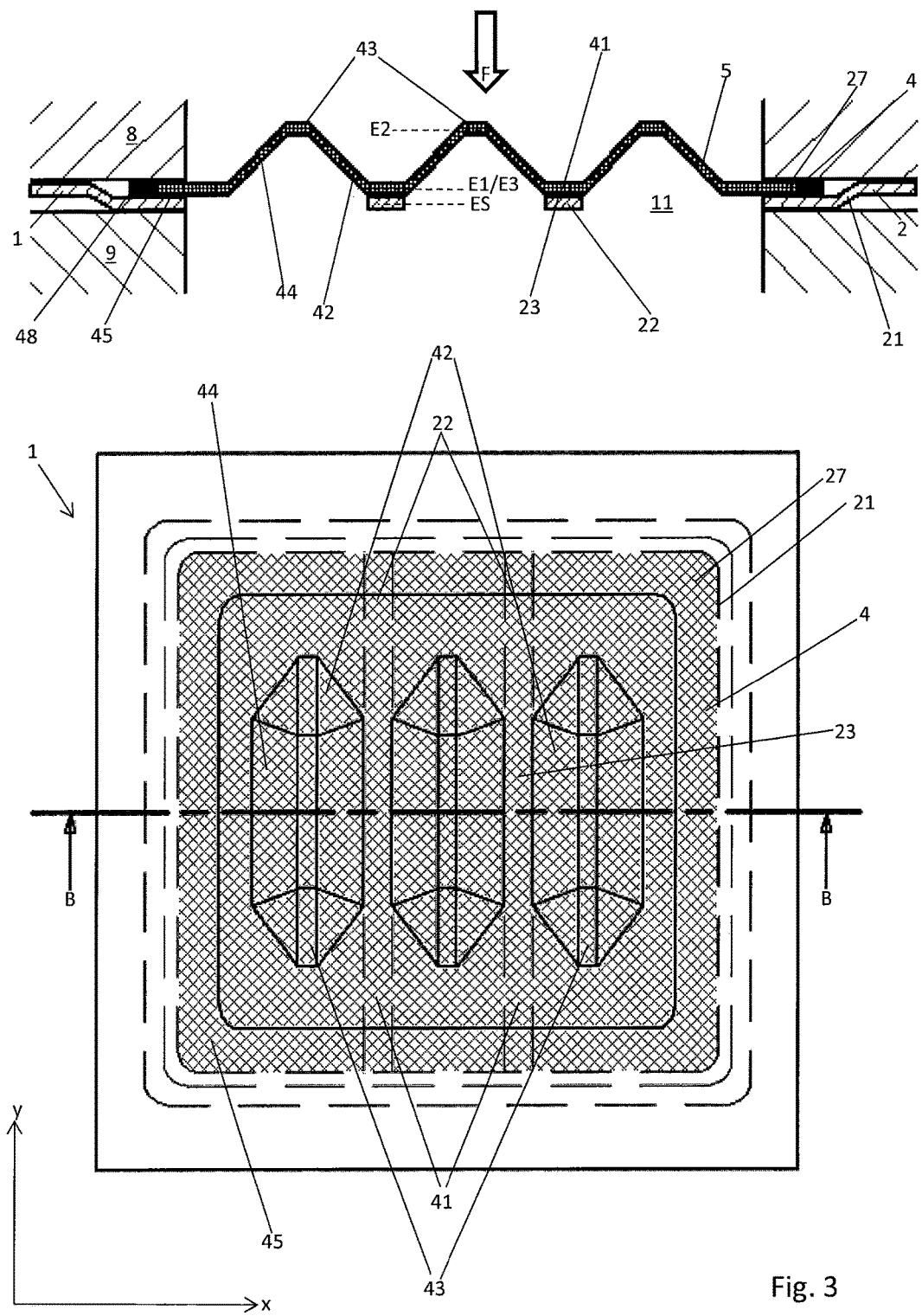
FIG. 3: In a top-view and in a cross-section a further embodiment of a metallic flat gasket according to the invention.

FIG. 3 shows an embodiment of the second variant of the metallic flat gasket 1 according to the invention with a metal sheet 2, in which a passage opening 11 is formed. This passage opening 11 is spanned by a filter element 4, which consists in a mesh material 5, which is compressed at the outer edge 48, so that the threads of the mesh material 5 cannot detach. As in the preceding embodiments, the filter element 4 is profiled, too. However, it does not comprise a single central resting section 41, but two elongate resting sections 41, which each extend at least in sections in the first plane E1. Both elongate resting sections 41 in sections rest on the support sections 22 of the gasket layer 2, namely in an area close to their center, and this way form inner contact sections 23; the support sections 22 are arranged behind the resting sections 41 with respect to the fluid passage direction F. The resting sections 41 on their longitudinal sides are each surrounded by camber sections 43, which are open towards the bottom and which in their cross-section appear as gutters opened downwardly, but which in their entirety have the shape of a tub that is upside down. The camber sections with the closed side of the tub each camber up to the plane E2, thus against the flow direction. The two resting sections 41 and the three camber sections 43 together are annularly surrounded by the edge section 45, which extends until the outer edge 48 of the filter element 4 in the third plane E3. Thus, the central camber section 43 here represents a camber section, which cooperates with the first and second resting section 41. The respective two extended contact areas 23 between each of the resting sections 41 of the filter element 4 and a support section 22 of the gasket layer 2 surround the camber sections in two areas together over somewhat more than 55% of their circumference.

Here, the filter element 4 comprises several first intermediate areas 42, which each extend between a resting section 41 and two camber sections 43 as well as several second intermediate areas 44, which each extend between a camber section 43 and the edge section 45. In this embodiment with the plurality of resting sections 41, an excellent increase of the filter area results, as a notable amount of sections are given which extend transverse to the plane ES of the support sections 22. The filter element 4 is completely surrounded by a half bead 21 in the metallic layer 2 of the flat gasket, so that a good sealing to the outside is given, too.

The coordinate system in FIG. 3 defines an x- and a y-direction. The embodiment shown in FIG. 3 of the flat gasket according to the invention is particularly suited for such passage openings 11, which have a larger extension in the x- than in the y-direction, in particular with an extension in the x-direction that is at least twice as large than in the y-direction, as here the plurality of tub-shaped camber sections 43 of the total area can make particular use of the larger total area.

Instead of the rather cornered cross-section of the camber sections 43, as it is given in the upper part of FIG. 3, embodiments with rather rounded cross-sections can be used. The total shape of the camber sections can deviate from the tub shape shown, e.g. be rounded to a higher degree, so that a round, oval or elliptic basic shape results.

Figure 4:
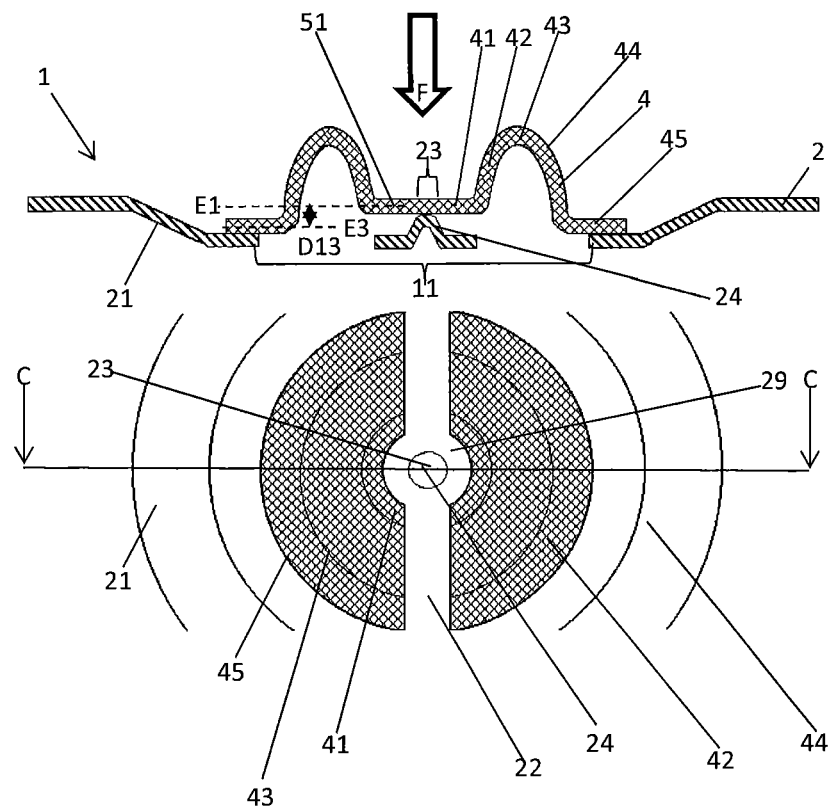
FIGS. 4 and 5: Each a cross-section and a partial schematic top-view to a further metallic flat gasket from its bottom side.

FIG. 4 represents a further embodiment of the metallic flat gasket 1 according to the invention, where the resting section 41, the camber section 43 and the edge section 45 each are realized circular and concentric to each other, as can be seen in the lower part of FIG. 4, which shows a top-view to a section of the flat gasket 1 from the bottom. This embodiment further differs from the one in FIG. 1 in that the support section 22 does not span the filter element 4 with constant width, but at half its width shows an enlargement 29. In this enlarged central section of the support section 22, in addition to this, a circular embossment 24 is given, which points in the direction of the filter element 4. The filter element 4 other than in the preceding embodiments shows a distance D13 between the planes E1 of the resting section 41 and E3 of the edge section 45, the closed area 51 of the resting section 41 is not embossed completely backwardly into the plane of the edge section 45. Due to this, the resting section 41 perfectly rests on the filter element in the contact area 23. The embossed section 24 in the spring hard steel layer further allows for resiliency. At the same time, the facial extension of the contact area 23 is minimized, so that the passage area of the filter element 4 is enlarged. These height relationships become particularly clear in the section along line C-C, which is depicted in the upper part of FIG. 4.

FIG. 4 further illustrates that with the flat gasket according to the invention it is possible to design this gasket in such a way that no projections over the plane of the gasket layer 2 occur in the area immediately surrounding the passage opening on the side of the gasket pointing in flow direction. This allows to also use the flat gasket according to the invention in such applications, where the conditions in the part adjoining the gasket require that a protrusion into its fluid opening needs to be avoided absolutely, e.g. since other parts are located it the fluid opening.

Figure 5:
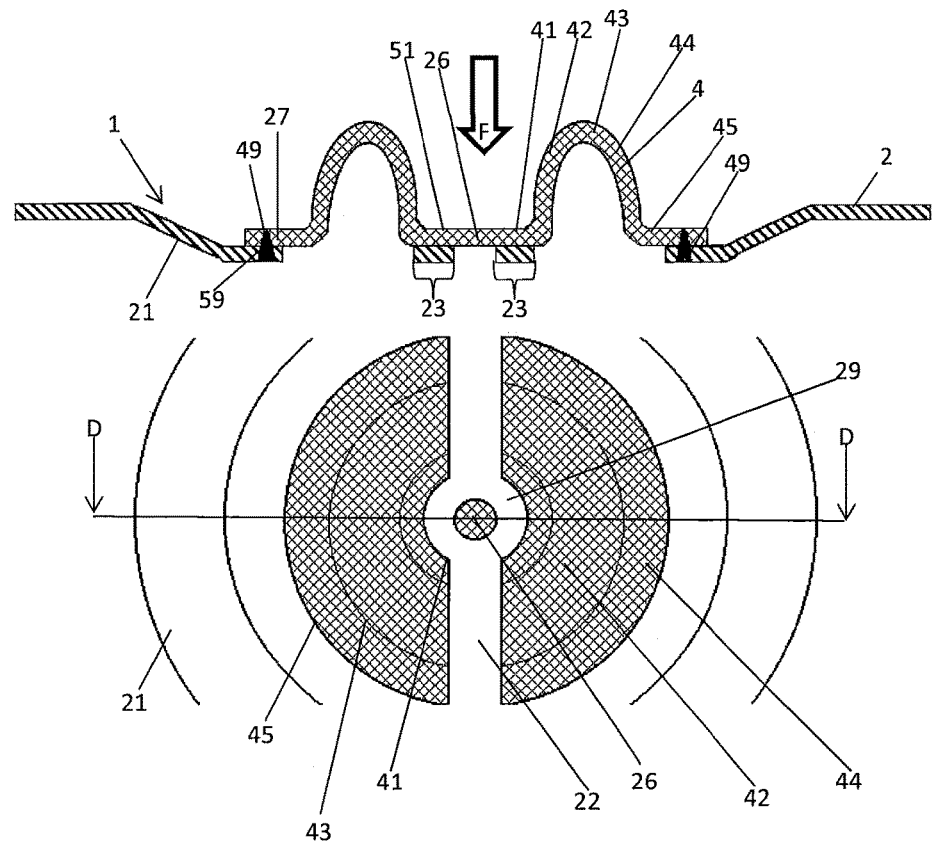

A further embodiment of a metallic flat gasket according to the invention 1 is given in FIG. 5, again in two partial figures. The section of the upper partial figure extends along the line D-D in the lower partial figure. While the preceding embodiments do without an explicit illustration of the connection between the at least one metallic layer 2 and the filter element 4, here, an adhesive connection, to be more precise a welding connection 59, in the connection section 49 and therefore in the outer contact area 27 is shown. The support section 22 of the metal sheet layer 2 is again designed bridge-shaped and in its central area as in the preceding example shows an enlargement 29. In this enlarged section 29, here, no embossment is given, but a passage opening 26, so that not the entire fluid, which in the central area flows from part 8 to part 9, is deflected, but that at least a part of the fluid can flow further linearly, which reduces the pressure loss. The size of the passage opening 26 in this context shall not be understood in such a way that it would be to scale. Rather, larger or smaller passage openings 26, are possible, too. Instead of a single passage opening, the support section can also comprise several passage openings 26.

Figure 6:
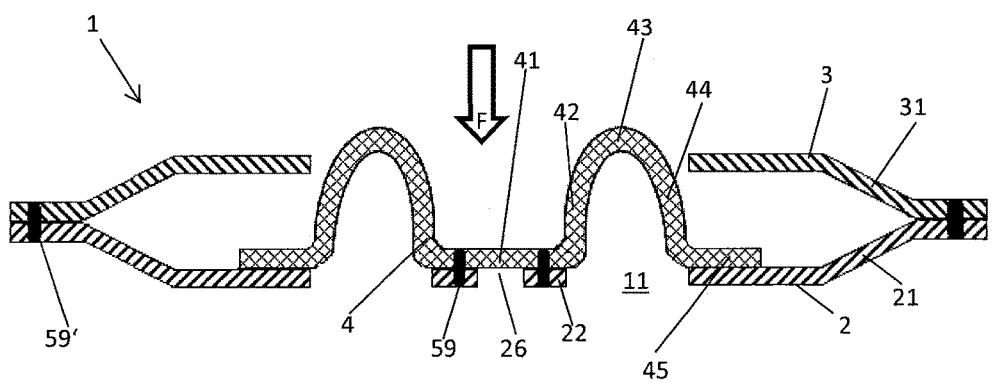
FIG. 6: A cross-section of a further metallic flat gasket according to the invention.

FIG. 6 represents a two-layered embodiment of a metallic flat gasket 1 according to the invention. The filter element 4 in its resting section 41 is connected to the support section 22 of the metal sheet layer 2 via a circumferential welding seam 59. The beads 21, 31 of the two gasket layers 2, 3 surround the filter element 4 and point towards opposite directions, so that they take up the edge section 45 of the filter element 4 between them. Adjacent to their outer edge, the two gasket layers 2, 3 are connected to each other via several welding points 59'. The filter element 4 itself is designed as in the embodiment of FIG. 5. As an alternative to a circumferential welding connection between the filter element 4 and the metal sheet layer 2, one or several spot weldings can be given.

An alternative opportunity for the fastening of the filter element 4 in a metallic flat gasket 1 according to the invention is illustrated with the help of three partial figures A to C in FIG. 7. Other than in the embodiments of FIGS. 1, 2 and 4, the resting section 41 here is not realized as a closed area, but consists in an annular area 52. This annular area 52 encloses a bowl-shaped section 53, which in partial figure A as a cylindrical bowl passes through a passage opening 26 in the support section, with the outer surfaces of the cylinder being essentially flush with the inner surfaces of the passage opening 26. In order to achieve a positive fit between the filter element 4 and the metal sheet layer 2, in a first connection method, the cylindrical bowl in the area of its protrusion over the lower edge of the support section 22 of the metal sheet layer 2 is first only deformed outwardly, as is indicated with a double arrow and "1". In a second step, the bowl is compressed in the direction of the lower edge of the support section 22, as is illustrated with the arrow marked as "2". In an alternative connection method that is not shown here, the deformation is realized using a hemispherical tool in a single step.

As is particularly obvious from partial figure B, this design in the area in which the deformed bowl does not rest on the support section 22, results in a fluid passage opening 26, which here is situated in the middle of the fluid flow channel. The filter element in the area of this fluid passage opening 26 extends in a fourth plane E4, which is different from the other defined planes E1, E2 and E3. The interaction between the positive fit and the compression of the bead 2 surrounding the filter element 4 in the installed state of the gasket provides for a secure sealing.

Figure 8:
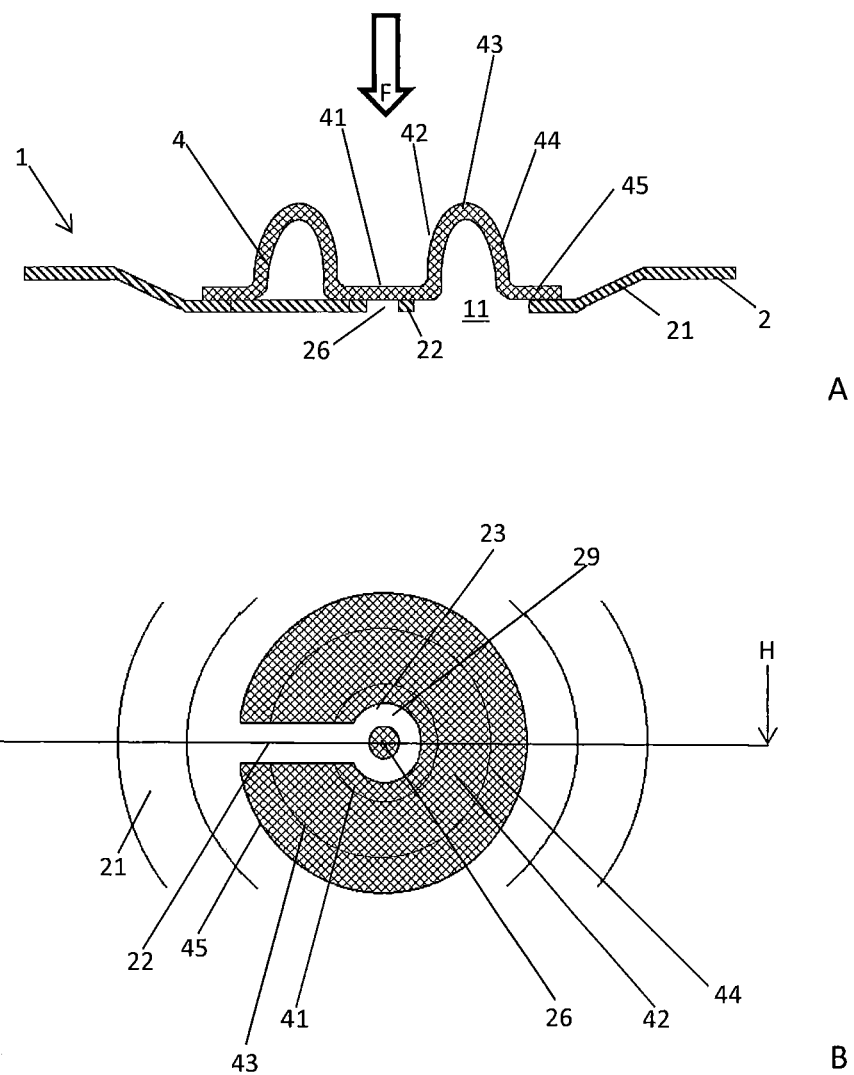

Using two partial figures A and B, FIG. 8 demonstrates that instead of a bridge-shaped support section 22 linking two sides of the passage opening 11, a support section 22 can be used, which like a landing stage only protrudes into the opening 11 from one side. In the contact section 23, an enlarged section 29 is given, which surrounds the passage opening 26.

In both partial figures A, B of FIG. 9, the support section 22 is realized like a Mercedes star with three bridges 22a, 22b, 22c and an enlarged section 29 forming the actual contact section 23, with a passage opening 26 being given in this enlargement section 29.

The overall round shape of the filter element 4 in the embodiment in FIG. 10 corresponds to the one of the embodiments in FIGS. 5, 6, 8 and 9. The support section 22 of the only metal sheet layer 2 of the metallic flat gasket, here consists in a nickel-based alloy. The support section 22 in its course again comprises an enlarged section 29, which is situated approximately central in the passage opening 11. Adjacent to this enlarged section 29, two bridge-shaped areas extend, in each of which a passage opening 26 is given. This already causes an enlargement of the fluid stream through the filter element 4, which consists in a wire from stainless steel with a weft thickness of 0.12 mm and a mesh width of 0.2 mm in the area of the steepest ascent of the filter element 4. This is further enlarged as the enlarged section 29 in a large surface area is situated opposite to the resting section 41 of the filter element 4, but the contact section 23 between the support section 22 and the resting section is limited to two lengthy embossments 24. With this, a large part of the area of the resting section 41 is distant to the support section 22, as becomes obvious from partial figure A. The section of this partial figure A therefore does not extend through the contact section 23, but along line K-K of partial figure B shifted to the former, in order to emphasize the distance.

As in FIG. 7, in the embodiment of FIG. 11, the resting section 41 is also realized as an annular area 52. Within this annular area 52, a bowl-shaped section 53 of the filter element 4 cambers in the direction of the circumferential camber section 43 to a plane E4, which again relates to the neutral fiber. In the present invention, the degree of cambering of the bowl-shaped section 53 and of the camber section 43, which is concentric to the former, is identical, so that the planes E2 and E4 here are identical. The planes E1 and E3, in which the resting section 41 and the edge section 45 extend, here coincide, too, but they are distanced to the planes E2 and E4. The metal sheet layer 2 of the flat gasket 1 here does not form a single support section 22, which bridges the filter element 4 bridge-shaped, but two bridge-shaped support sections 22a, 22b extend essentially parallel between the edges of the passage opening 11. The support sections 22a, 22b in a projection into the plane of the support section ES do show a constant width, but in their course comprise narrow, lengthy embossments 24. In the area of these embossments 24, only a small, central area of the support section 22 rests on the resting section 41, the lateral edges of the support section 22 point away from the resting section 41, so that a particular high passage area results, as becomes clear especially from partial figure A. The contact area 23 here is considerably smaller than 10% and even smaller than 5% of the total facial extend of the filter element projected into the plane ES. Partial figure B demonstrates that the embossments are only realized in the area which is surrounded by the edge section 45.

While in the present example, the embossments 24 lead to a V-shaped structure which in the fully embossed areas show an angle of about 45°, more pronounced structures are possible, too. The cross-section does not need to be V-shaped, but may be approximately Π or Γ-shaped, too. The angles here may be up to 90°. The bent areas which extend transverse to the contact surface 23 provide the support section 22 with an improved stability. For production reasons, they preferably run out towards the outer edge of the passage opening 11.

One can also derive from FIG. 11, that other than in the frame-shaped supports of the gaskets in the state of the art with filter insert, the contact area 23 between the support sections 22 or 22a, 22b and the resting section 41 at least in sections is very close to the centroid of the filter element 4 or of the passage opening 11. The distance from the inner contact area 23 to the center of the passage opening 11 here amounts to 27.5% of the radius of the passage opening. Referred to the area, the inner contact surface 23 thus extends at least in sections within the innermost 10% of the area of the passage opening around the center or the centroid.

Figure 12:
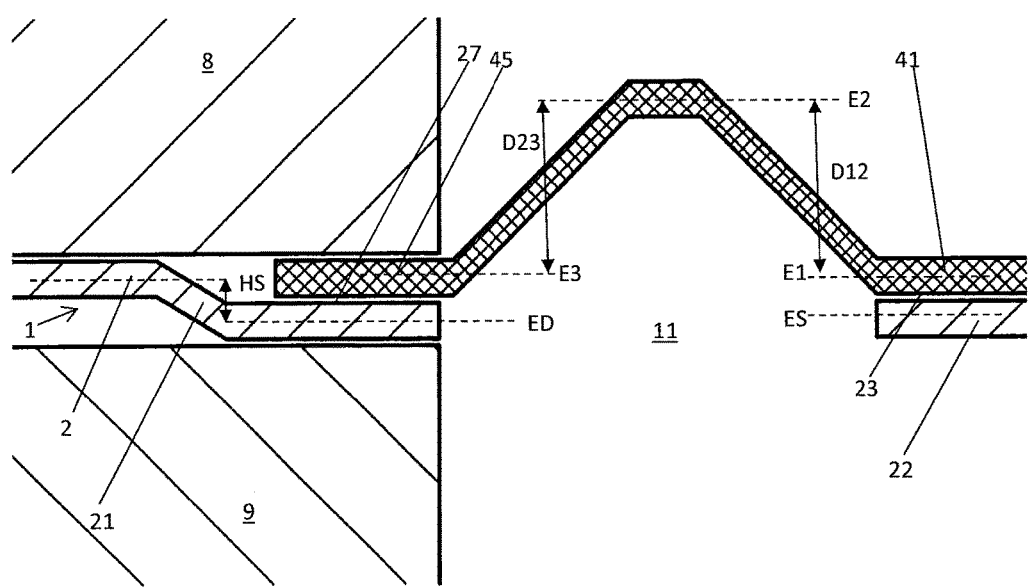
FIG. 12: A schematic sketch for the illustration of the geometric relationships within flat gaskets according to the invention.

FIG. 12 illustrates the relationship of thicknesses and distances in a flat gasket 1 according to the invention. The distance D11 and D23 between the first and second plane on the one hand and between the second and third plane on the other hand here is identical and amounts to between 1 and 20 mm, preferably between 3 and 10 mm. If the resting section 41 does not completely camber backward to the plane E3 of the edge section 45, as this is the case in the embodiment of FIG. 4, then D12 and D23 are different; D23 can be larger by up to 2 mm, preferably up to 1 mm than D12. The height of the bead HS usually amounts to 0.2 to 1.5 mm, preferably 0.2 to 1 mm. If one or the only support section 22 comprises embossed structures, such as the bowl-shaped embossment 24 in FIG. 4, the lengthy embossments 24 in FIG. 10 or the extended embossments 24 in FIG. 11, then these embossments show comparable dimensions of embossment as the half bead 21 already mentioned, thus 0.2 to 1.5 mm. A slight bending of the support 22 can be accepted in the frame of the invention, so that the entire support section 22 runs in an area which extends orthogonal to the plane ED of the gasket layer 2 at the edge of the passage opening 11 over up to 2.5 mm, preferably up to 1.5 mm in both directions.

All examples of metal flat gaskets according to the invention are suited for various uses, in which a flat gasket in addition to its actual sealing task also has to take over filtering tasks. The metallic flat gaskets according to the invention are particularly suited in the area of hot gases, especially exhaust gases and in this context preferably as gasket in the area of exhaust gas recirculation, in particular in the area of low-pressure exhaust gas recirculation.

The invention claimed is:

1. A metallic flat gasket with at least one metallic layer and at least one filter element, with the at least one metallic layer comprising at least one passage opening, which is covered by the filter element, with the filter element comprising a mesh material, wherein
the filter element comprises at least one resting section, which extends at least in sections in a first plane, comprising at least one gutter-shaped camber section stretching along, or surrounding, the at least one resting section at least in sections, wherein the at least one gutter-shaped camber section camber to a second plane, and comprising at least one edge section surrounding the at least one resting section and the at least one camber section at least in sections, wherein the at least one edge section extends in a third plane at least in sections, with the second plane being different from the first and third plane.

2. The metallic flat gasket according to claim 1, wherein the filter element comprises at least two gutter-shaped camber sections stretching along, or surrounding, the at least one resting section at least in sections, wherein the at least two camber sections camber to the second plane, and wherein the least one edge section surrounds the resting section and the at least two camber sections at least in sections.

3. The metallic flat gasket according to claim 1, wherein the least one edge section surrounds the at least one resting section and the at least one camber section annularly.

4. The metallic flat gasket according to claim 3, wherein the at least one resting section and the at least one camber section in a projection of the filter element into the plane spanned by the edge of the passage opening are situated inside of this passage opening.

5. The metallic flat gasket according to claim 1, wherein the filter element in the area of its edge section at least in sections rests on the at least one metallic layer while forming an outer contact section.

6. The metallic flat gasket according to claim 5, wherein the filter element in the area of its edge section at least in sections is connected to the at least one metallic layer while forming a connection section with an adhesive connection.

7. The metallic flat gasket according to claim 1, wherein the at least one passage opening outside of the connection section is surrounded by a bead formed in the at least one metallic layer.

8. The metallic flat gasket according to claim 1, wherein the at least one metallic layer forms at least one support section, which protrudes into the at least one passage opening, with the support section of the first metallic layer comprising at least one contact section, on which the resting section of the filter element rests.

9. The metallic flat gasket according to claim 7, wherein the at least one support section bridges the passage opening, wherein the support section
- is star-shaped, with more than one ray of the star; or
- along its extension in length direction comprises at least one enlarged section; or
- in the area of the inner contact section comprises an embossment.

10. The metallic flat gasket according to claim 1, wherein the support section of the at least one metallic layer and the resting section of the filter element in the area of the inner contact section are connected to each other, with the connection being adhesive or with a positive fit.

11. The metallic flat gasket according to claim 1, wherein the resting section of the filter element forms a closed area.

12. The metallic flat gasket according to claim 1, wherein the resting section forms an annular area, which encircles a bowl-shaped section, with the bowl-shaped section pointing away from the first plane and reaching to a fourth plane.

13. The metallic flat gasket according to claim 1, wherein a distance between the second plane and the third plane is 3 to 10 mm.

14. The metallic flat gasket according to claim 1, wherein the first plane and the third plane are identical.

15. The metallic flat gasket according to claim 1, wherein a distance between the first plane and the third plane is up to 1 mm.

16. The metallic flat gasket according to claim 1, wherein in a projection of the area of the filter element into a plane of the support section of the first metallic layer, the facial extension of the inner contact section is at the most 5% of the area of the filter element projected into the plane of the support section.

17. The metallic flat gasket according to claim 1, wherein the filter element at least in sections comprises a metallic woven material.

18. The metallic flat gasket according to claim 1, wherein the filter element in the edge section and outside of the connection section comprises a wire thickness of 0.05 to 0.15 mm.

19. The metallic flat gasket according to claim 1, wherein the filter element in an area of its steepest ascent between the first and second plane comprises a mesh width of 0.1 to 0.3 mm.

20. The metallic flat gasket according to claim 1, wherein the filter element at its outer edge is compressed at least in sections.

21. The metallic flat gasket according to claim 1, wherein at least one metallic layer is comprised of steel and that the tensile strength of the steel is at least 1350 N/mm$^2$.

22. The metallic flat gasket according to claim 1, wherein the at least one metallic layer is comprised of a nickel-based alloy and that the tensile strength of the nickel-based alloy is at least 900 N/mm$^2$.

23. The metallic flat gasket according to claim 1, wherein the metallic flat gasket is for low-pressure exhaust gas recirculation.

* * * * *